(12) United States Patent
Sabic et al.

(10) Patent No.: US 12,058,993 B2
(45) Date of Patent: Aug. 13, 2024

(54) LIGHTING MOSQUITO KILLER LAMP

(71) Applicant: TECHTRONIC CORDLESS GP, Anderson, SC (US)

(72) Inventors: Adis Sabic, Hong Kong (CN); Wong Kar Tat, Hong Kong (CN); An Wei Wei, Guangdong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 430 days.

(21) Appl. No.: 17/474,735

(22) Filed: Sep. 14, 2021

(65) Prior Publication Data
US 2022/0110308 A1 Apr. 14, 2022

(30) Foreign Application Priority Data
Sep. 23, 2020 (CN) .......................... 202022112309.3

(51) Int. Cl.
*A01M 1/04* (2006.01)
*A01M 1/22* (2006.01)

(52) U.S. Cl.
CPC .............. *A01M 1/04* (2013.01); *A01M 1/223* (2013.01); *A01M 2200/012* (2013.01)

(58) Field of Classification Search
CPC ............................... A01M 1/223; A01M 1/04
USPC ..................................... 42/112, 113
See application file for complete search history.

(56) References Cited

U.S. PATENT DOCUMENTS

| | | | | |
|---|---|---|---|---|
| 1,539,360 A | * | 5/1925 | Knutsson | A01M 1/04 43/112 |
| 1,664,027 A | * | 3/1928 | Fillier | A01M 1/04 43/112 |
| 3,473,251 A | * | 10/1969 | Kahn | A01M 1/223 43/112 |
| 3,680,251 A | * | 8/1972 | Springer | A01M 1/223 43/112 |

(Continued)

FOREIGN PATENT DOCUMENTS

| | | |
|---|---|---|
| CN | 203120795 U | 8/2013 |
| CN | 207461259 U | 6/2018 |

(Continued)

OTHER PUBLICATIONS

Merged translation of WO-8200567-A1 (Year: 1982).*

(Continued)

*Primary Examiner* — Morgan T Jordan
(74) *Attorney, Agent, or Firm* — Dority & Manning, P.A.

(57) ABSTRACT

A lighting mosquito killer lamp which includes a main body and a base joined with the main body. The main body includes a housing, a lampshade arranged in the housing, and a high-voltage mesh wire arranged on the lampshade. The base receives power. The lighting mosquito killer lamp further includes a lighting lamp and an ultraviolet lamp. The lighting lamp is different from the ultraviolet lamp, and the lighting lamp and the ultraviolet lamp are controlled independently of each other. The lighting mosquito killer lamp further includes a cleaning brush having bristles that clean away mosquitos attached to the high-voltage mesh wire as the cleaning brush moves along a guide rod of the housing. The cleaning brush includes a brush handle that protrudes from the housing for operation by a user.

20 Claims, 6 Drawing Sheets

(56) References Cited

U.S. PATENT DOCUMENTS

| | | | | |
|---|---|---|---|---|
| 3,986,292 A | * | 10/1976 | Klebanoff | A01M 1/223 43/112 |
| 4,182,069 A | * | 1/1980 | De Yoreo | A01M 1/04 43/112 |
| 4,523,404 A | * | 6/1985 | DeYoreo | A01M 1/04 43/112 |
| 4,603,505 A | * | 8/1986 | Millard | A01M 1/04 362/179 |
| 4,785,573 A | * | 11/1988 | Millard | A01M 1/04 362/179 |
| 4,962,611 A | * | 10/1990 | Millard | A01M 1/223 362/179 |
| 5,515,643 A | * | 5/1996 | Lin | A01M 1/223 43/112 |
| 5,595,018 A | * | 1/1997 | Wilbanks | A01M 1/223 43/112 |
| 6,055,766 A | * | 5/2000 | Nolen | A01M 1/023 43/112 |
| 6,134,826 A | * | 10/2000 | Mah | A01M 1/223 43/99 |
| 6,618,984 B1 | * | 9/2003 | Li | A01M 1/223 43/107 |
| 7,832,140 B2 | * | 11/2010 | Wilbanks | A01M 1/023 43/112 |
| 8,875,437 B1 | * | 11/2014 | Xie | A01M 1/223 43/112 |
| 2007/0086912 A1 | * | 4/2007 | Dowling | C02F 1/325 422/1 |
| 2009/0094883 A1 | * | 4/2009 | Child | A01M 1/023 43/112 |
| 2010/0058646 A1 | * | 3/2010 | Scholz | A01M 1/04 43/112 |
| 2016/0050901 A1 | * | 2/2016 | Pugh | A01M 1/223 43/112 |
| 2019/0307113 A1 | * | 10/2019 | Horne | A01M 1/04 |
| 2023/0104986 A1 | * | 4/2023 | Perlman | A01M 1/04 43/107 |

FOREIGN PATENT DOCUMENTS

| | | |
|---|---|---|
| CN | 207678705 U | 8/2018 |
| CN | 208047809 U | 11/2018 |
| CN | 208875189 U | 5/2019 |
| CN | 209768674 U | 12/2019 |
| CN | 210860740 U | 6/2020 |
| JP | WO-8200567 A1 * | 3/1982 |

OTHER PUBLICATIONS

Canadian Office Action Corresponding with Application No. 3,131,561 on Sep. 18, 2023 (1 page).

European Search Report Corresponding to Application No. 21195637 on Feb. 4, 2022; 2 pages.

Canadian Office Action Corresponding with Application No. 3131561 on Dec. 14, 2022 (1 page).

* cited by examiner

LIGHTING MOSQUITO KILLER LAMP

This application claims the benefit of priority to Chinese Patent Application No. 202022112309.3, filed on Sep. 23, 2020, the disclosure of which is incorporated by reference herein in its entirety.

TECHNICAL FIELD

The present utility model relates to a lighting mosquito killer lamp, in particular to a lighting mosquito killer lamp that kills mosquitoes with a high-voltage mesh wire.

BACKGROUND ART

Mosquito killer lamps have become an efficient instrument for killing mosquitoes in summer. At present, mosquito killer lamps are mainly ultraviolet ones, which use long-wave ultraviolet rays in the UV spectrum. A mosquito killer lamp kills mosquitoes by taking advantage of phototaxis, which is a special life habit of mosquitoes. Ideally, after a mosquito sees the light emitted by a mosquito killer lamp, it keeps getting close to the light source until being hit by a high-voltage mesh wire near the light source. When mosquitoes are killed by a high-voltage mesh wire, no odour or chemical nuisance is produced. Thanks to their environmental friendliness, such mosquito killer lamps have become more and more popular.

However, the light emitted by a conventional ultraviolet mosquito killer lamp is mainly bluish violet light and in the ultraviolet band, and, if emitted for a long time, will cause discomfort to the human eye, so is not good for lighting at night. This field is still in need of a mosquito killer lamp that provides comfortable lighting.

SUMMARY OF THE UTILITY MODEL

In view of the above-described background, an objective of the present utility model is to provide a mosquito killer lamp with a lighting function, in particular a lighting mosquito killer lamp that kills mosquitoes with a high-voltage wire.

Those of ordinary skill in the art will derive other objectives of the present utility model from the following description. Therefore, the preceding statement of objects is not exhaustive, and is only intended to explain some of the many objectives of the present utility model.

Therefore, one aspect of the present utility model is a lighting mosquito killer lamp that comprises: a main body comprising a housing, a lampshade arranged in the housing, a high-voltage mesh wire arranged on the lampshade, and a base joined with the bottom of the main body, the base being used for receiving power. The lighting mosquito killer lamp further comprises a lighting lamp and an ultraviolet lamp. The lighting lamp is different from the ultraviolet lamp, and the lighting lamp and the ultraviolet lamp are controlled independently of each other.

In some embodiments, the main body and the base are joined together in a detachable manner.

In some embodiments, the power supply is an AC power source, a disposable battery, a rechargeable battery, or power provided by USB.

In some embodiments, a joint electrical connection component is arranged between the main body and the base; the joint electrical connection component breaks the electrical connection between the main body and the base when the main body is separated from the base, and establishes an electrical connection between the main body and the base when the main body and the base are joined together in place.

In some embodiments, the electrical connection component comprises a first electrical contact piece mounted to either the base or the main body, and the first electrical contact piece has a length extending in a circumferential direction.

In some embodiments, the electrical connection component comprises a second electrical contact piece mounted to the other of the base and the main body, and the second electrical contact piece is elastically deformable in a vertical direction.

In some embodiments, the main body further comprises a cleaning brush with bristles, and the bristles, by the movement of the cleaning brush, clean away any mosquitoes attached to the high-voltage mesh wire.

In some embodiments, the cleaning brush is a cleaning ring with a brush handle, and the brush handle is provided with a through hole; with the help of the through hole, the brush handle is slidably sleeved in a vertical direction on a guide rod arranged in the main body, and the outermost end of the brush handle protrudes from the housing for operation by a user.

In some embodiments, the main body further comprises a receiving tray located below the cleaning ring.

In some embodiments, the receiving tray has a U-shaped configuration, which defines an internal open space for receiving mosquitoes, and the receiving tray is removably mounted to the main body.

In some embodiments, the main body further comprises a mounting seat between the cleaning ring and the receiving tray, and the mounting seat at least partially shields the area under the bristles of the cleaning ring to which the receiving tray does not extend.

In some embodiments, on the outside of the lampshade, a supporting structure is provided on which the high-voltage mesh wire may be wound, and the high-voltage mesh wire comprises a positive mesh wire and a negative mesh wire.

In some embodiments, the high-voltage mesh wire is designed as a single layer, with the positive and negative mesh wires arranged adjacent to and away from each other on the same layer.

In some embodiments, the high-voltage mesh wire is designed as a plurality of layers, with the positive and negative mesh wires arranged adjacent to and away from each other on different layers, a distance between mesh wires on the outer layer being larger than a distance between mesh wires on the inner layer.

In some embodiments, the high-voltage mesh wires are arranged as a structure spirally descending in parallel along the cylindrical surface of the lampshade, a net-like structure, or a vertical parallel structure.

In some embodiments, the lighting mosquito killer lamp further comprises an operation interface that consists of a mosquito killing switch and a lighting switch.

In some embodiments, the lighting switch further provides a brightness adjustment function for the lighting lamp.

In some embodiments, the lighting mosquito killer lamp further comprises a main circuit board and a high-voltage circuit board; the main circuit board at least comprises a control module for the operation interface and a control module for the lighting lamp, and the high-voltage circuit board drives the high-voltage mesh wire.

In some embodiments, the operation interface is located on the top of the housing, the main circuit board and the high-voltage circuit board are arranged above the lampshade and below the operation interface, and the main circuit board is located above the high-voltage circuit board.

In some embodiments, the lighting mosquito killer lamp further comprises a USB circuit board for charging a rechargeable battery.

BRIEF DESCRIPTION OF THE DRAWINGS

The above-described and additional characteristics of the present utility model will become apparent from the following description of preferred embodiments provided only as examples and in conjunction with the drawings. Among the drawings.

SPECIFIC EMBODIMENTS

In the subsequent claims and the preceding description of the present utility model, except for a contextual additional need that arises from linguistic expression or necessary implication, the word "comprise" or, for example, a variant thereof (for example, "include" or "contain") is used in an inclusive manner, that is, indicating the presence of said characteristic, but not excluding the presence or addition of an additional characteristic in various embodiments of the present utility model.

For example, the terms "horizontal", "vertical", "transverse", "longitudinal", "above", "below", and similar terms used herein are intended to describe the present utility model in an orientation of normal use of the present utility model, instead of being intended to limit the present utility model to any specific orientation.

It is understandable that if any publication on the prior art is cited herein, then such a reference does not constitute an acknowledgement that the publication forms part of the common general knowledge in the field in any country.

Lighting mosquito killer lamps according to some embodiments of the present utility model will be described below with reference to the drawings.

Figure 1:
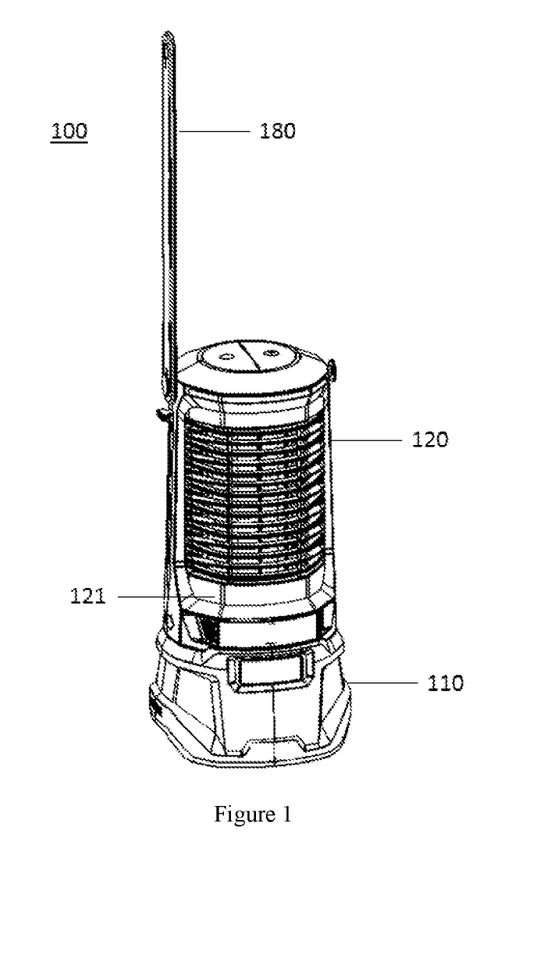
FIG. 1 shows a perspective view of a lighting mosquito killer lamp according to an embodiment of the present utility model.
Figure 4:
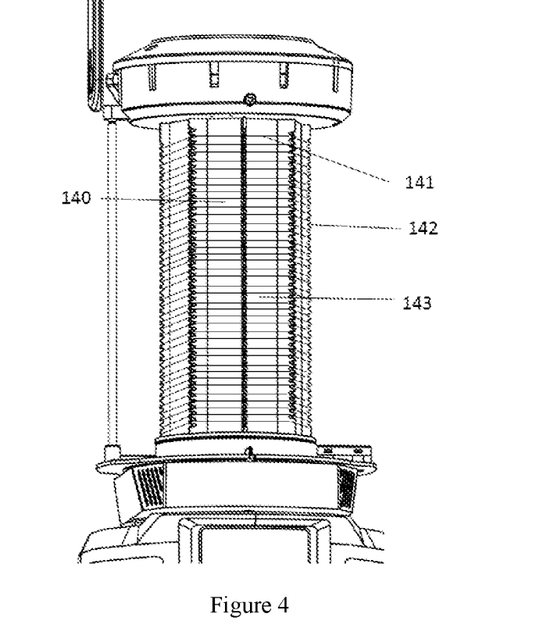
FIG. 4 shows a schematic diagram of a lampshade according to an embodiment of the present utility model.
Figure 10:
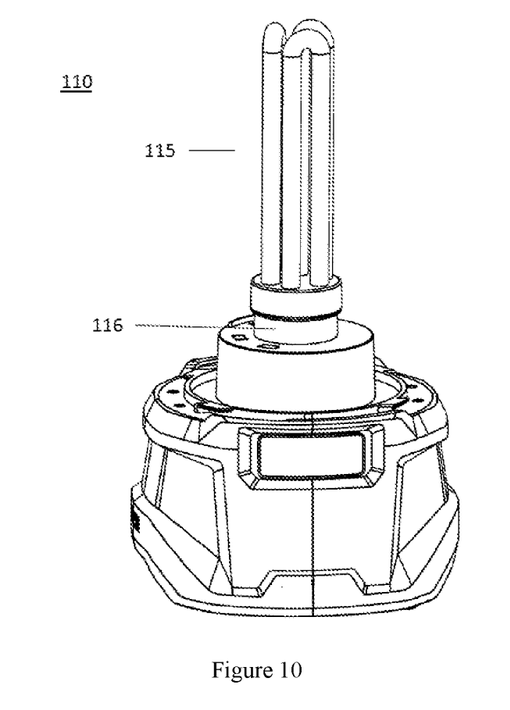
FIG. 10 shows a schematic diagram of a base according to an embodiment of the present utility model.

FIG. 1 shows a perspective view of a lighting mosquito killer lamp 100 according to an embodiment of the present utility model. As shown in FIG. 1, the lighting mosquito killer lamp 100 comprises a main body 120 and a base 110. The main body 120 comprises a housing 121 formed on the upper part of the lighting mosquito killer lamp 100, which may be used to isolate the internal high-voltage mesh wire 141 (FIG. 4). The base 110 is arranged at the lower part of the lighting mosquito killer lamp 100, and may be used to mount the ultraviolet lamp 115 (FIG. 10). In some embodiments, the main body 120 and the base 110 may be screwed together by screw threads. In some embodiments, the main body 120 and the base 110 are joined together in a snap-fitting manner. The main body 120 and the base 110 may be joined together without tools in any manner that makes it convenient for a user to complete mounting and removal, or may be joined together by a user with a simple tool. In some embodiments, a handle 180 may be formed or attached near the top of the main body 120. The handle 180 may be provided in various forms, including, but not limited to, a lifting rod, a carrying ring, a carrying strap, and a hook.

Figure 2:
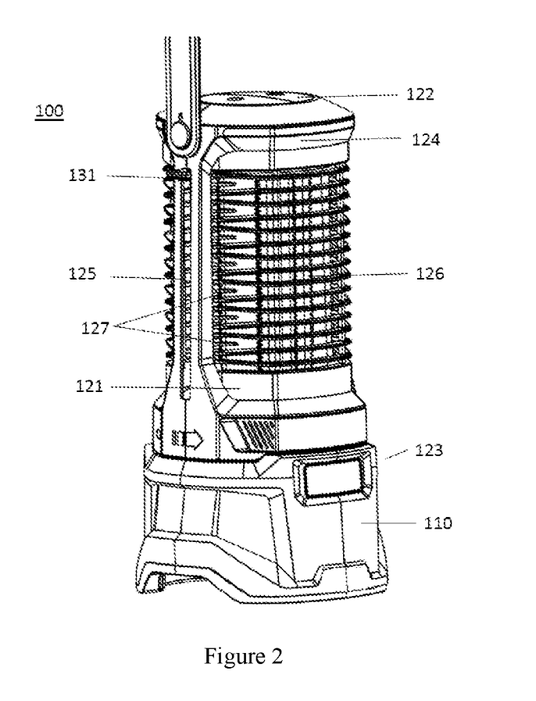
FIG. 2 shows a perspective view of a lighting mosquito killer lamp according to an embodiment of the present utility model.

FIG. 2 shows a perspective view of a lighting mosquito killer lamp 100 according to an embodiment of the present utility model. As shown in FIG. 2, the top 122 of the housing 121 of the main body 120 may be provided with an operation interface 150 (FIG. 5), which will be described in detail later, and the bottom 123 of the housing 121 of the main body 120 is joined with the base 110. A side wall is further formed on the housing 121 of the main body 120. The housing 121 is preferably formed by joining two portions: a front portion and a rear portion, and may also be formed integrally or by joining more portions. The housing 121 preferably has a cylindrical side shape, and may also adopt other shapes, including, but not limited to, a hexagonal prism and an octagonal prism.

Figure 3:
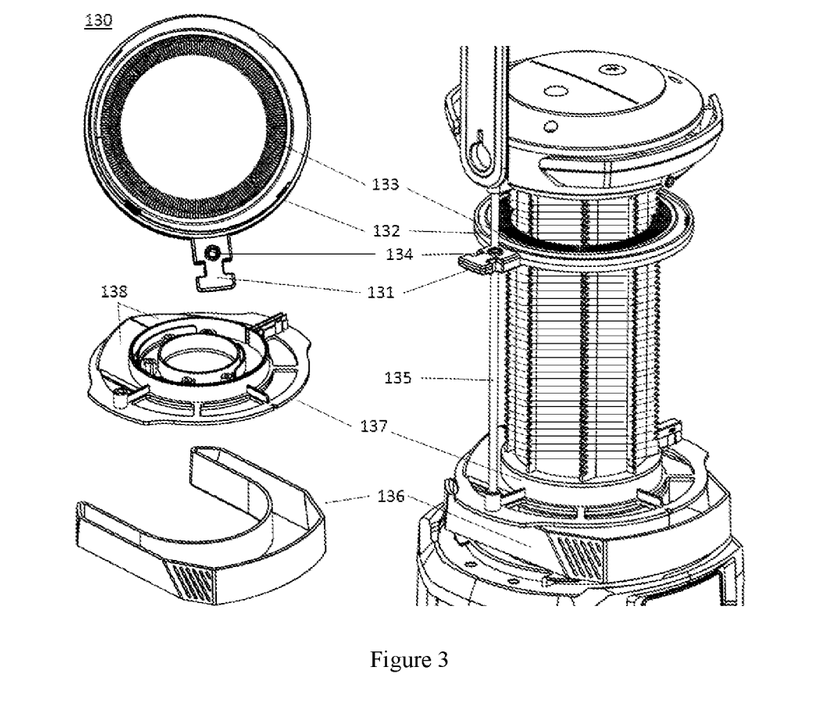
FIG. 3 shows a schematic diagram of a cleaning ring, a receiving tray, and a mounting seat according to an embodiment of the present utility model.

The housing 121 is provided with a plurality of openings. A variety of openings for different purposes are formed in the side wall of the housing 121. One or more openings may be arranged above the side wall near the top, for the arrangement of a lamp shell 124 through which the light emitted by the lighting lamp 170 (FIG. 7) passes. An opening in the side wall further comprises a brush handle opening 125 following the direction of the movement track of the brush handle 131 of the cleaning brush 130 (FIG. 3). The part of the brush handle 131 protruding from the outer side of the housing 121 through the brush handle opening 125 is operable by a user. One or more brush handle openings 125 may be provided corresponding to the number of brush handles 131, which will be described in detail below. A large number of grids 126 are formed on the side wall. The grids 126 should be sized and shaped to allow easy passage of mosquitoes, while preventing the passage of a finger. The grids 126 may be arranged to be substantially horizontally parallel or substantially vertically parallel, or may be arranged in a mesh shape. In the embodiment shown in FIG. 1, the housing 121 is formed by joining two portions: a front portion and a rear portion; the grids 126 of each portion are arranged as a plurality of substantially horizontally parallel openings that are in parallel in the middle and slightly wider at both ends; a protective tooth 127 may be arranged in the middle of a grid 126 that is wider at both ends to prevent the entry of a finger. One or more openings (not shown) may also be provided at the bottom of the side wall for joining the base 110 or for an aesthetic purpose.

The main body 120 further comprises a cleaning brush 130 arranged inside the housing 121. The cleaning brush 130 may be in the form of a cleaning ring 132. FIG. 3 shows a schematic diagram for the cleaning ring 132, the receiving tray 136, and the mounting seat 137 according to an embodiment of the present utility model. As shown in FIG. 3, the upper-left part is a schematic diagram for the separated cleaning ring 132, the middle-left part is a schematic diagram for the separated mounting seat 137, the lower-left part is a schematic diagram for the separated receiving tray 136, and the right half is a schematic diagram for the cleaning ring 132, the receiving tray 136, and the mounting seat 137 that are mounted in place. The cleaning ring 132 is provided, on the inside, with bristles 133 for cleaning away any mosquitoes attached to the high-voltage mesh wire 141. The bristles 133 are preferably non-conductive. At least one brush handle 131 is provided outside the cleaning ring 132. In some embodiments, two or more brush handles 131 are symmetrically arranged outside the cleaning ring 132. At least part of the brush handle 131 is provided with a through hole 134, and the through hole 134 is slidably sleeved on a vertically arranged guide rod 135 so that the cleaning ring 132 is movable along the guide rod 135. The guide rod 135 is fixed inside the housing 121 and outside the high-voltage mesh wire 141, and extends along the high-voltage mesh wire 141 in a vertical direction. Thus, when moving along the guide rod 135, the cleaning ring 132 can clean the high-voltage mesh wire 141. The outermost end of the brush handle 131 protrudes from the housing 121 for operation by a user. The outermost end of the brush handle 131 may be set to have a wide shape so that a user may conveniently drive, with his/her fingers, the brush handle 131 to move.

In some embodiments (not shown), the cleaning brush 130 may be strip-shaped and arranged vertically. The inside of the brush is provided with non-conductive bristles 133, and the brush body is provided with at least one through hole 134. The through hole 134 is slidably sleeved on a ring, so that the cleaning brush 130 may make at least partially circumferential movements along the ring to achieve the purpose of cleaning the high-voltage mesh wire 141. The ring may be fixed inside the housing 121 and outside the high-voltage mesh wire 141, and extends along the high-voltage mesh wire 141 in the circumferential direction. The ring may be arranged on the top, at the bottom, or in the middle of the brush body, or more than one ring may be provided. The brush handle 131 extends from the brush body and protrudes from the housing 121 for operation by a user. Therefore, a corresponding annular brush handle opening 125 is provided on the housing 121.

Those of ordinary skill in the art can understand that the two embodiments described above are only for illustrative purposes, and the form of the cleaning brush 130 as well as the number and positions of the brush handles 131 may be set as required. When a specific number of mosquitoes have accumulated, a user can move the cleaning brush 130, and the mosquitoes on the high-voltage mesh wire 141 are brushed off and fall onto the receiving tray 136 by gravity. The user can remove the receiving tray 136 from the housing 121 of the main body 120, pour out the mosquitoes that have fallen on the receiving tray 136, and then mount the receiving tray 136 to the housing 121 again. When not in use, the cleaning brush 130 may be placed in a position where it does not block the grid 126. In the embodiment shown in FIG. 3, the cleaning ring 132, when not in use, may be left at the top or at the bottom of the lampshade 140 (FIG. 4), and is preferably separated from the high-voltage mesh wire 141 by a certain distance.

In some embodiments, the receiving tray 136 is arranged in the inner space of the housing 121. When viewed from the top, the position of the receiving tray 136 roughly coincides with the position of the bristles 133 of the cleaning brush 130. In some embodiments, the receiving tray 136 generally has a U-shaped configuration, which defines an internal open space for receiving mosquitoes. The receiving tray 136 is joined with the internal space of the housing 121 in a snap-fitting manner, etc. In some embodiments, a mounting seat 137 is further arranged above the receiving tray 136. The mounting seat 137 shields the area below the bristles 133 of the cleaning brush 130 to which the receiving tray 136 does not extend. This prevents mosquitoes from falling into an area beyond the mounting seat 137 and the receiving tray 136. In some embodiments, the mounting seat 137 has a sloping configuration 138 in the above-mentioned area to ensure that mosquitoes slide, as much as possible, into the receiving tray 136 with the aid of the sloping configuration 138. In some embodiments, the mounting seat 137 is also used for mounting at least one of the lampshade 140 and the guide rod 135.

FIG. 4 shows a schematic diagram of the lampshade 140 according to an embodiment of the present utility model. As shown in FIG. 4, the main body 120 has a lampshade 140 and is arranged inside the housing 121. A high-voltage mesh wire 141 is arranged on the outer periphery of the lampshade 140, and the inner bristles 133 of the cleaning brush 130, when moving, may be tightly appressed to the high-voltage mesh wire 141 outside the lampshade 140. The lampshade 140 is designed to be light-transmissive, for transmitting the light emitted by the ultraviolet lamp 115 on the inside to the outside of the main body 120 to attract mosquitoes. Considering that a dark and transparent lampshade 140 would absorb ultraviolet rays, a colourless or light-coloured transparent plastic cover may be selected as the lampshade 140. The lampshade 140 is preferably designed as a cover body with a closed periphery, and only an opening for joining the bottom and the base 110 together is left. When the main body 120 and the base 110 are joined together, the ultraviolet lamp 115 on the base 110 may be enclosed therein to prevent any mosquitoes from flying into the lampshade 140.

On the outside of the lampshade 140, supporting teeth 142 or other types of supporting structures on which the high-voltage mesh wire 141 may be wound are arranged. Characteristics of the supporting structure mainly depend on the arrangement of the high-voltage mesh wire 141. The high-voltage mesh wire 141 may be designed as consisting of a single layer or a plurality of layers. Positive and negative mesh wires may be arranged adjacent to and away from each other on the same layer or on different layers. The high-voltage mesh wire 141 may be arranged as a structure that spirally descends in parallel along the cylindrical surface 143 of the lampshade 140. The high-voltage mesh wire 141 may also be arranged as a mesh structure. The high-voltage mesh wire 141 may also be arranged as a vertical parallel structure in which the positive and negative electrodes are adjacent to and away from each other. A distance between the outer mesh wires may be greater than a distance between the inner mesh wires, so that larger mosquitoes are hit by the outer layer and smaller mosquitoes are hit by the inner layer. Those of ordinary skill in the art will understand that the above-described structure is not restrictive.

Figure 5:
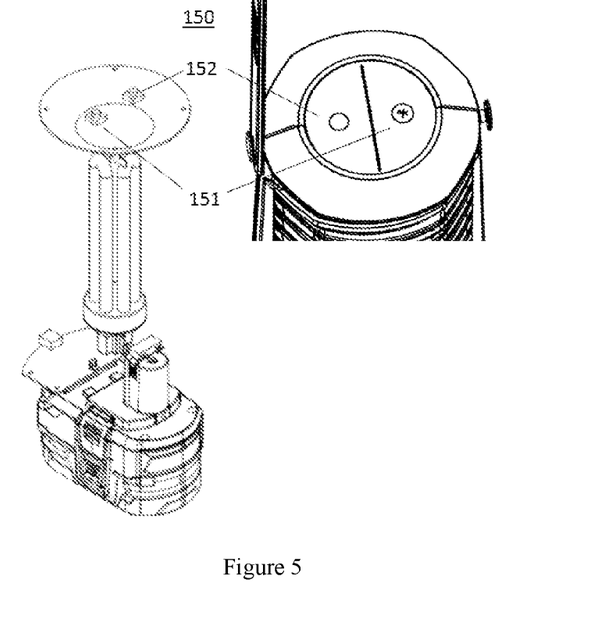
FIG. 5 shows a schematic diagram of an operation interface according to an embodiment of the present utility model.

The main body 120 may further comprise an operation interface 150 on the top. The operation interface 150 may also be provided on the base 110. FIG. 5 shows a schematic diagram of the operation interface 150 according to an embodiment of the present utility model. As shown in FIG. 5, the operation interface 150 is provided on the top 122 of the housing 121. The operation interface 150 is provided with two independent switches: a mosquito killer switch 151 and a lighting switch 152. The mosquito killer switch 151 and the lighting switch 152 are controlled independently of each other. The mosquito killer switch 151 is configured to simultaneously control the ultraviolet lamp 115 and the high-voltage mesh wire 141. When the mosquito killer switch 151 is pressed, the ultraviolet lamp 115 is turned on, and the high-voltage mesh wire 141 is activated; when the mosquito killer switch 151 is pressed again, the ultraviolet lamp 115 is turned off, and the high-voltage mesh wire 141 is powered off; this process may be repeated in the same manner. In some embodiments, the lighting lamp 170 may be adjusted to a plurality of levels of brightness. For example, when the lighting switch 152 is pressed for a first time, 30% brightness is turned on; when the lighting switch 152 is pressed for a second time, 60% brightness is turned on; when the lighting switch 152 is pressed for a third time, 100% brightness is turned on; when the lighting switch 152 is pressed for a fourth time, the lighting lamp 170 is turned off; this process may be repeated in the same manner. Those of ordinary skill in the art can understand that the above-described keyed operation interface 150 is only exemplary and not restrictive. The operation interface 150 may be set to be more complicated or simpler. For example, a switch may be of a push-key type, a knob type, a toggle type, etc., and a push-key switch may further be of a membrane type, a button type, a light touch type, etc. In addition, a switch may also provide settings for the lighting time and the operating time of the ultraviolet lamp 115.

Figure 6:
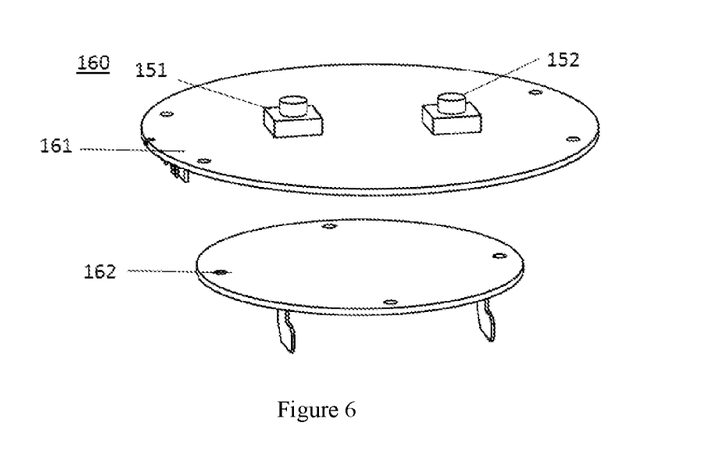
FIG. 6 shows an exploded view of a circuit board according to an embodiment of the present utility model.

The main body 120 has a circuit board 160 and a lighting lamp 170 that are arranged above the lampshade 140 and below the operation interface 150. The circuit board 160 may comprise a main circuit board 161 and a high-voltage circuit board 162. The main circuit board 161 or the high-voltage circuit board 162 may also be arranged on the base 110. The main circuit board 161 and the high-voltage circuit board 162 may be arranged on the same circuit board 160, and may be arranged on the same side or either side of the same circuit board 160. FIG. 6 shows an exploded view of the circuit board 160 according to an embodiment of the present utility model. As shown in FIG. 6, the circuit board 160 is located below the operation interface 150. The circuit board 160 is arranged above the main body 120 together with the operation interface 150, which allows the circuit design to be simplified. The main circuit board 161 is located above the high-voltage circuit board 162 and adjacent to the lower part of the operation interface 150.

The main circuit board 161 is connected to a power source, and may optionally comprise a power management module depending on the power source. The main circuit board 161 at least comprises a control module of the operation interface 150 and a control module of the lighting lamp 170. These modules, for example, may be implemented with dedicated LED lamp control chips, or with other programmable MCUs, or with discrete digital devices or analogue devices. Those of ordinary skill in the art will understand that the above-mentioned examples are not restrictive. The main circuit board 161 may further comprise a line (not shown) connected to the high-voltage circuit board 162 and a line (not shown) connected to the ultraviolet lamp 115.

Lines connected to the high-voltage circuit board 162 may include a power line, a ground wire, and a control signal line. Activation of the high-voltage circuit board 162 is controllable by the control signal line. The high-voltage circuit board 162 may use a PCBA circuit with a transformer and a capacitor to generate a high voltage through a voltage-doubling rectifier circuit. A transformation into a high voltage may also be achieved in another manner. The high-voltage output line of the high-voltage circuit board 162 is connected to the high-voltage mesh wire 141 to drive the high-voltage mesh wire 141.

In a preferred embodiment of the present utility model, the power source is a battery provided in the base 110; therefore, the control signal line connected to the ultraviolet lamp 115 may, together with the power line and the ground wire, in a manner of being insulated from each other and from the outside, extend to the bottom of the housing 121 along the inner wall of the housing 121 from the main circuit board 161.

Figure 7:
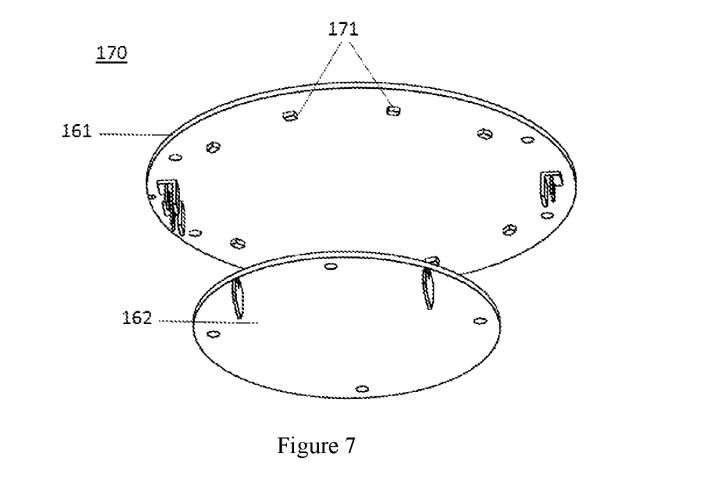
FIG. 7 shows a schematic diagram of a lighting lamp according to an embodiment of the present utility model.

FIG. 7 shows a schematic diagram of the lighting lamp 170 according to an embodiment of the present utility model. As shown in FIG. 7, one or more lighting LED lamps 171 are preferably adopted as the lighting lamp 170. An LED lamp, having a small size, providing high brightness, and with a long service life, may be directly arranged on the main circuit board 161. It is understandable that a lighting lamp 170 in another form may also be used. In some embodiments, according to the above-described brightness control with the lighting switch 152, the brightness of the lighting LED lamp 171 may be adjusted by regulating an output current. In some embodiments, according to the above-described brightness control with the lighting switch 152, brightness may be adjusted by the number of lamps turned on. For example, when 30% brightness is turned on by adjustment, only ⅓ of the lighting LED lamps 171 are turned on; when 60% brightness is turned on by adjustment, only ⅔ of the lighting LED lamps 171 are turned on; when 100% brightness is turned on by adjustment, all the lighting LED lamps 171 are turned on. The lighting LED lamp 171 is preferably a white-light or yellow-light LED lamp, and may also be configured as an LED lamp of another colour. According to actual needs, for example, when the lighting mosquito killer lamp 100 is used at a camping site in the wild, the lighting LED lamp 171 may also be configured as a lamp of a plurality of colours, which can emit coloured light through light variation control. Light emitted by the lighting LED lamp 171 may provide illumination through the housing 121, that is, illuminating the surrounding environment through the lamp shell 124 arranged on the side wall of the housing 121. Since the lamp shell 124 is opened on the side wall in this embodiment, the lighting LED lamp 171 may be arranged on the outer periphery of the main circuit board 161. Optionally, a reflector plate is provided on the inner surface of the main circuit board 161 adjacent to the housing 121 to improve the lighting efficiency.

Figure 8:
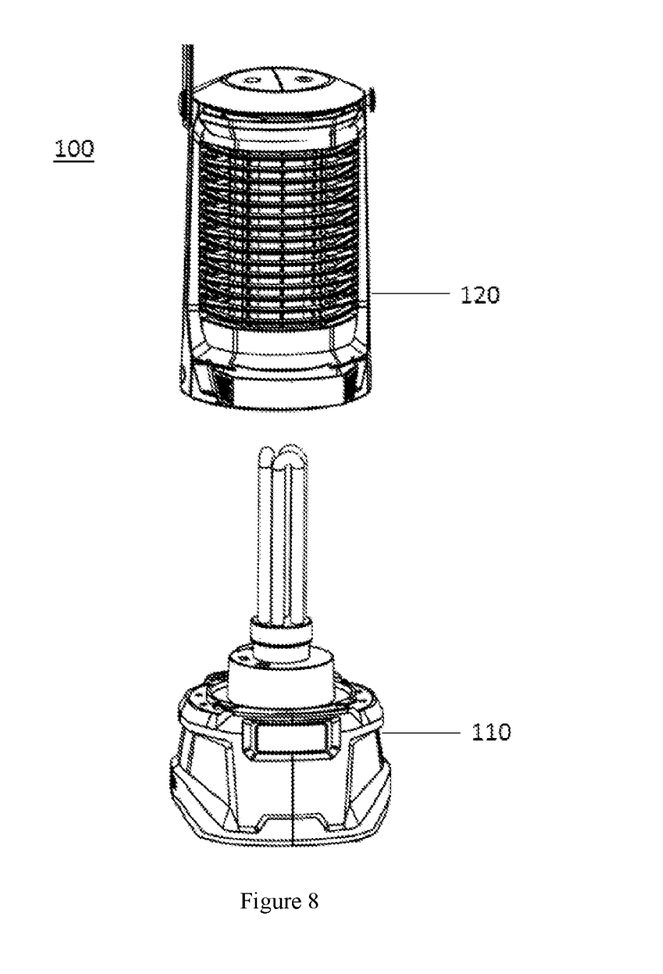
FIG. 8 shows a schematic diagram for the removal of the main body from the base according to an embodiment of the present utility model.

FIG. 8 shows a schematic diagram for the removal of the main body 120 from the base 110 according to an embodiment of the present utility model. As shown in FIG. 8, the housing 121, the handle 180, the cleaning brush 130 (the guide rod 135 or the ring), the lampshade 140, the high-voltage mesh wire 141, the circuit board 160, the lighting lamp 170, and the operation interface 150, as components of the main body 120, are all fixed together in such a manner well known in the art that none of them is likely to fall off. When the main body 120 is separated from the base 110, the above-mentioned components of the main body 120 are separated from the base 110 as a whole.

Figure 9:
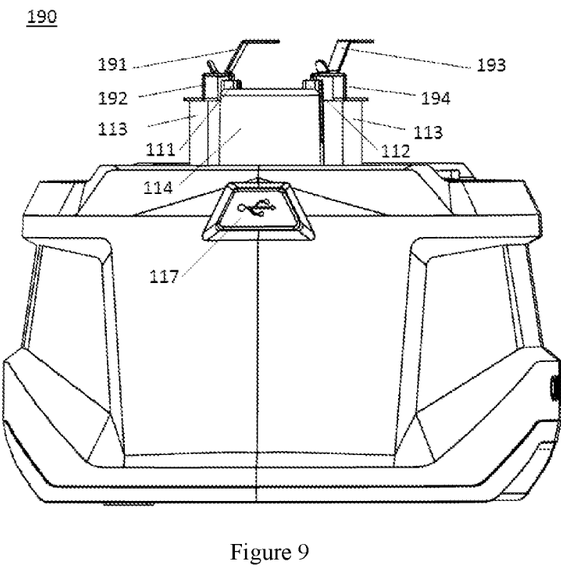
FIG. 9 shows a schematic diagram of a joint electrical connection component according to an embodiment of the present utility model.

FIG. 9 shows a schematic diagram of a joint electrical connection component 190 according to an embodiment of the present utility model. As shown in FIG. 9, the joint electrical connection component 190 is provided between the main body 120 and the base 110. The joint electrical connection component 190 may be arranged such that when the main body 120 is separated from the base 110, the electrical connection between the main body 120 and the base 110 is forcibly broken. This arrangement can prevent a user from accidentally touching the high-voltage mesh wire 141 or being exposed to the ultraviolet lamp 115; when the main body 120 and the base 110 are joined together in place, an electrical connection is established between the main body 120 and the base 110. However, since the operation interface 150 has not been switched on at this time, the joint electrical connection component 190 cannot activate the ultraviolet lamp 115, the high-voltage mesh wire 141, or the lighting lamp 170.

The joint electrical connection component 190 is preferably arranged as two groups of electrical contact pieces: group A of electrical contact pieces and group B of electrical contact pieces. Each group of electrical contact pieces comprises a first electrical contact piece connected to a battery and a second electrical contact piece fixed on the bottom 123 of the main body 120. In some embodiments, the first electrical contact piece 192 in group A of electrical contact pieces is configured to be connected to the positive terminal 111 of the battery, and the first electrical contact piece 194 in group B of electrical contact pieces is configured to be connected to the negative terminal 112 of the battery. The second electrical contact piece 191 in group A of electrical contact pieces is arranged to be electrically connected to the power line extending downwards from the main circuit board 161 along the inner wall of the housing 121. The second electrical contact piece 193 in group B of electrical contact pieces is arranged to be electrically connected to the ground wire extending downwards from the main circuit board 161 along the inner wall of the housing 121. In some embodiments, the second electrical contact piece 191 in group A of electrical contact pieces is arranged to be electrically connected to the power line of the ultraviolet lamp 115 on the base 110 after the main body 120 is joined with the base 110; the second electrical contact piece 193 in group B of electrical contact pieces is arranged to be electrically connected to the ground wire of the ultraviolet lamp 115 on the base 110 after the main body 120 is joined with the base 110.

In some embodiments, the first electrical contact pieces 192 and 194 are jointly supported by a battery terminal receiving portion and columnar supports 113 distributed outside the battery terminal receiving portion. The second electrical contact pieces 191 and 193 are mounted on the mounting seat 137 (FIG. 3). In some embodiments, the first electrical contact pieces 192 and 194 have a length extending in the circumferential direction. Such a configuration is particularly advantageous when the main body 120 and the base 110 are connected by rotation. The length of the first electrical contact pieces 192 and 194 in the circumferential direction ensures that an electrical connection may be established between the main body 120 and the base 110 even when they are not sufficiently rotated relative to each other. For example, the first electrical contact pieces 192 and 194 extend between the battery terminal receiving portion and the columnar supports 113 distributed outside the battery terminal receiving portion to provide the above-mentioned circumferential length. In some embodiments, the second electrical contact pieces 191 and 193 are elastically deformable in a vertical direction. This allows the second electrical contact pieces 191 and 193 to be sufficiently crimped onto the first electrical contact pieces 192 and 194 when the main body 120 is mounted to the base 110. For example, the second electrical contact pieces 191 and 193 have a cantilever structure.

In some embodiments, the first electrical contact pieces 192 and 194 may be realised by a single element. Two legs extend from the lower surface of the single element to connect the positive and negative terminals of the battery respectively, and the lead wires of the two legs pass through the element to form, on its upper surface, two electrical contact pieces insulated from each other. The two electrical contact pieces may be joined with the second electrical contact pieces 191 and 193, respectively. It is understandable that the number and forms of the joint electrical connection components 190 are only exemplary and not restrictive. In some embodiments, the configurations or mounting positions of the first electrical contact pieces 192 and 194 as well as the second electrical contact pieces 191 and 193 are interchangeable.

FIG. 10 shows a schematic diagram of the base 110 according to an embodiment of the present utility model. The base 110 comprises an ultraviolet lamp socket 116 formed on the base 110. The ultraviolet lamp 115 is preferably a non-ozone-type LED ultraviolet lamp tube, and a control circuit and a plurality of LED ultraviolet lamps may be arranged inside the ultraviolet lamp tube. An ultraviolet lamp tube in another form may also be selected. The bottom of the ultraviolet lamp 115 is provided with a connector, which is electrically connected to a lamp port in an upper part of the lamp socket. As described above, the power line of the ultraviolet lamp 115 may be electrically connected to the electrical contact piece 191 in group A of electrical contact pieces after the main body 120 is joined with the base 110, and the ground wire of the ultraviolet lamp 115 may be electrically connected to the electric contact piece 193 in group B of electric contact pieces after the main body 120 is joined with the base 110. In addition, the control signal line of the ultraviolet lamp 115 that extends downwards from the main circuit board 161 along the inner wall of the housing 121 can control the activation of the ultraviolet lamp 115. When the ultraviolet lamp 115 needs to be replaced, a user can conveniently separate the main body 120 from the base 110, remove from the lamp port the ultraviolet lamp 115 to be replaced, and replace it with a new ultraviolet lamp 115.

The base 110 may further comprise a power source. It is understandable that the power source may also be provided on the top of the main body 120. The forms of the power source include, but are not limited to, USB power, commercial power, solar power, and a disposable battery. In the embodiment shown in FIG. 9, the power source is a rechargeable battery 114 arranged under the lamp socket, which not only improves the portability of the lighting mosquito killer lamp 100, but also improves its stability when it is left to stand. The rechargeable battery 114 is enclosed by a battery case integrally arranged with the base housing. Optionally, the rechargeable battery 114 may be taken out of the battery case. As described above, the positive terminal 111 of the battery is electrically connected to the electrical contact piece 192 in group A of electrical contact pieces, and the negative terminal 112 of the battery is electrically connected to the electrical contact piece 194 in group B of electrical contact pieces. In some embodiments, the ultraviolet lamp 115 and the rechargeable battery 114 are both arranged on the base 110; however, for the sake of safety, neither the power line nor the ground wire of the ultraviolet lamp 115 is directly electrically connected to the positive or negative electrode of the rechargeable battery 114; an electrical connection may be established between the power line as well as the ground wire of the ultraviolet lamp 115 and the positive and negative electrodes of the rechargeable battery 114 only when the main body 120 and the base 110 are joined together in place.

The base 110 may comprise a USB circuit board arranged near the lamp socket, and a USB port 117 is arranged on the base housing (FIG. 9). The power line and the ground wire of the USB circuit board may be directly electrically connected to the positive and negative terminals of a battery. In some embodiments, the USB circuit board may be connected to an external power source to charge the rechargeable battery 114. In some embodiments, an external USB device may be connected to the USB circuit board. In some embodiments, the USB circuit board may be connected to an external power source that functions as the power source of the lighting mosquito lamp 100.

When the lighting mosquito lamp 100 is left to stand on the ground, the distance between the ground support point on the base 110 and the lower edge of a charged device is at least 10 mm, so that the charged device, for example, a battery case or a USB port, will not be short-circuited due to contact with a wet ground surface. An anti-skid pad is optionally provided at the ground support point on the base 110.

While the present utility model has been illustrated and described in detail above in conjunction with the drawings, the description should be regarded as illustrative rather than restrictive; it should be understood that only exemplary embodiments are shown and described, and that they do not limit the present utility model in any way. It is understandable that any characteristic described herein may be used in any embodiment. Illustrative embodiments do not exclude each other or exclude any other embodiment not listed herein. Therefore, the present utility model further provides a combination of one or more of the above-described exemplary embodiments. Modifications and variations may be made to the present utility model without departing from the spirit or scope of the present utility model. Therefore, such restrictions should be imposed only as indicated by the appended claims.

The invention claimed is:

1. A lighting mosquito killer lamp, comprising:
   a main body that comprises a housing, a lampshade arranged in the housing, and a high-voltage mesh wire arranged on the lampshade;
   a base joined with the main body, the base configured to receive power;
   a lighting lamp and an ultraviolet lamp, the lighting lamp being different from the ultraviolet lamp, the lighting lamp and the ultraviolet lamp being controlled independently of each other; and
   a cleaning brush having bristles that clean away mosquitos attached to the high-voltage mesh wire as the cleaning brush moves along a guide rod of the housing, the cleaning brush comprising a brush handle that protrudes from the housing for operation by a user.

2. The lighting mosquito killer lamp as claimed in claim 1, wherein the main body and the base are joined together in a detachable manner, and wherein power is transmitted from the base to the main body through an electrical connection component.

3. The lighting mosquito killer lamp as claimed in claim 2, wherein the electrical connection component comprises a first electrical contact piece coupled to the base, and the electrical connection component comprises a second electrical contact piece coupled to the main body.

4. The lighting mosquito killer lamp as claimed in claim 3, wherein the first electrical contact piece has a length extending in a circumferential direction, and the second electrical contact piece is elastically deformable in a vertical direction.

5. The lighting mosquito killer lamp as claimed in claim 2, wherein a joint electrical connection component is arranged between the lighting lamp and the base; the joint electrical connection component breaks the electrical connection between the lighting lamp and the base when the lighting lamp is separated from the base, and establishes an electrical connection between the lighting lamp and the base when the lighting lamp and the base are joined together in place.

6. The lighting mosquito killer lamp as claimed in claim 1, wherein the main body further comprises a receiving tray located below the cleaning brush.

7. The lighting mosquito killer lamp as claimed in claim 6, wherein the main body further comprises a mounting seat between the cleaning brush and the receiving tray, and the mounting seat at least partially shields the area under the bristles of the cleaning brush to which the receiving tray does not extend.

8. The lighting mosquito killer lamp as claimed in claim 6, wherein the receiving tray has a U-shaped configuration, which defines an internal open space for receiving mosquitoes, and the receiving tray is removably mounted to the main body.

9. The lighting mosquito killer lamp as claimed in claim 1, wherein on the outside of the lampshade, a supporting structure is provided on which the high-voltage mesh wire is wound, and the high-voltage mesh wire comprises a positive mesh wire and a negative mesh wire.

10. The lighting mosquito killer lamp as claimed in claim 9, wherein the high-voltage mesh wire comprises a single layer, and the positive and negative mesh wires are arranged adjacent to and spaced apart from each other on the same layer.

11. The lighting mosquito killer lamp as claimed in claim 1, wherein the lighting mosquito killer lamp further comprises an operation interface that consists of a mosquito killing switch and a lighting switch.

12. The lighting mosquito killer lamp as claimed in claim 11, wherein the lighting mosquito killer lamp further comprises a main circuit board and a high-voltage circuit board; the main circuit board at least comprises a control module for the operation interface and a control module for the lighting lamp, and the high-voltage circuit board drives the high-voltage mesh wire.

13. The lighting mosquito killer lamp as claimed in claim 12, wherein the operation interface is located on a top of the housing, the main circuit board and the high-voltage circuit board are arranged above the lampshade and below the operation interface, and the main circuit board is located above the high-voltage circuit board.

14. The lighting mosquito killer lamp as claimed in claim 11, wherein the lighting switch further provides a brightness adjustment function for the lighting lamp.

15. The lighting mosquito killer lamp as claimed in claim 1, wherein the base is configured to receive power from a power supply, wherein the power supply comprises one or more of an AC power source, a disposable battery, a rechargeable battery, or power provided by USB.

16. The lighting mosquito killer lamp as claimed in claim 15, wherein the lighting mosquito killer lamp further comprises a USB circuit board for charging a rechargeable battery.

17. A lighting mosquito killer lamp comprising:
   a main body that comprises a housing, a lampshade arranged in the housing, a high-voltage mesh wire arranged on the lampshade, a cleaning brush with bristles, wherein the bristles, by the movement of the cleaning brush, clean away any mosquitoes attached to the high-voltage mesh wire;
a base joined with the main body, the base configured to receive power; and
a lighting lamp and an ultraviolet lamp, the lighting lamp being different from the ultraviolet lamp, the lighting lamp and the ultraviolet lamp being controlled independently of each other,
wherein the cleaning brush is a cleaning ring with a brush handle, and the brush handle is provided with a through hole; with the help of the through hole, the brush handle is slidably sleeved in a vertical direction on a guide rod arranged in the main body, and the outermost end of the brush handle protrudes from the housing for operation by a user.

18. A lighting mosquito killer lamp comprising:
a main body comprising:
  a housing;
  a high-voltage mesh wire; and
  a cleaning brush comprising a brush handle and bristles,
  wherein the brush handle protrudes from the housing for operation by a user to slide the cleaning brush along a guide rod to move the bristles to clean mosquitoes attached to the high-voltage mesh wire;
a base coupled to the main body; and
a lighting lamp and an ultraviolet lamp, the lighting lamp being different from the ultraviolet lamp.

19. The lighting mosquito killer lamp of claim 18, wherein the brush handle is provided with a through hole; with the help of the through hole, the brush handle is slidably sleeved in a vertical direction on the guide rod arranged in the main body, and an outermost end of the brush handle protrudes from the housing for operation by a user.

20. The lighting mosquito killer lamp of claim 18, wherein the lighting mosquito killer lamp further comprises an operation interface that consists of a mosquito killing switch and a lighting switch.

\* \* \* \* \*